United States Patent
Lai et al.

(10) Patent No.: US 9,767,836 B2
(45) Date of Patent: Sep. 19, 2017

(54) METHOD FOR MAKING AN ORDERED MAGNETIC ALLOY

(71) Applicant: National Tsing Hua University, Hsinchu (TW)

(72) Inventors: Chih-Huang Lai, Hsinchu (TW); Liang-Wei Wang, Hsinchu (TW); Yun-Chung Wu, Taipei (TW); Wen-Chieh Shih, Pingtung (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 947 days.

(21) Appl. No.: 14/063,815

(22) Filed: Oct. 25, 2013

(65) Prior Publication Data
US 2014/0366990 A1   Dec. 18, 2014

(30) Foreign Application Priority Data
Jun. 17, 2013   (TW) .............................. 102121345 A

(51) Int. Cl.
| | |
|---|---|
| *G11B 5/84* | (2006.01) |
| *G11B 5/851* | (2006.01) |
| *C21D 1/26* | (2006.01) |
| *H01F 10/12* | (2006.01) |
| *H01F 41/22* | (2006.01) |
| *H01F 10/30* | (2006.01) |

(52) U.S. Cl.
CPC ................. *G11B 5/84* (2013.01); *C21D 1/26* (2013.01); *G11B 5/8404* (2013.01); *H01F 10/123* (2013.01); *H01F 41/22* (2013.01); *C21D 2201/00* (2013.01); *C21D 2251/02* (2013.01); *H01F 10/30* (2013.01)

(58) Field of Classification Search
CPC ......... G11B 5/84; G11B 5/8404; G11B 5/851; C21D 2201/00; C21D 2251/02
See application file for complete search history.

(56) References Cited

U.S. PATENT DOCUMENTS

2013/0034748 A1\*   2/2013   Ishio .................. G11B 5/70615
428/836.2

FOREIGN PATENT DOCUMENTS

JP   WO 2011132747 A1 \* 10/2011 ......... G11B 5/70615

OTHER PUBLICATIONS

Wang et al., "Promotion of [001]-Oriented L10-FePt by Rapid Thermal Annealing with Light Absorption Layer", Applied Physics Letters, 2012, pp. 252403-1-252403-4, vol. 101.

\* cited by examiner

*Primary Examiner* — Colleen Dunn
*Assistant Examiner* — Anthony Liang
(74) *Attorney, Agent, or Firm* — Birch, Stewart, Kolasch & Birch, LLP

(57) ABSTRACT

A method for making an ordered magnetic alloy includes (a) providing a thermally conductive base having opposite first and second surfaces; (b) forming a thermal barrier layer on the first surface of the thermally conductive base; (c) forming a disordered magnetic alloy layer on the thermal barrier layer, the disordered magnetic alloy layer being made from a disordered alloy which contains a first metal selected from Fe, Co, and Ni, and a second metal selected from Pt and Pd; and (d) after step (c), applying a transient heat to the thermally conductive base to cause rapid thermal expansion of the thermally conductive base, which, in turn, causes generation of an in-plane tensile stress in the disordered magnetic alloy layer.

7 Claims, 10 Drawing Sheets

METHOD FOR MAKING AN ORDERED MAGNETIC ALLOY

CROSS-REFERENCE TO RELATED APPLICATIONS

This application claims priority of Taiwanese Patent Application No. 102121345, filed on Jun. 17, 2013.

BACKGROUND OF THE INVENTION

1. Field of the Invention

This invention relates to a method for making an ordered magnetic alloy, more particularly to a method for making an ordered magnetic alloy including applying a transient heat to a thermally conductive base to cause generation of an in-plane tensile stress in a disordered magnetic alloy layer to thereby order the disordered magnetic alloy layer.

2. Description of the Related Art

A magnetic material, such as FePt alloy or CoPt alloy, can be used for making a high storage density perpendicular magnetic recording medium. In order to achieve high thermal stability for the high storage density perpendicular magnetic recording medium, the magnetic material is required to have a high magnetocrystalline anisotropy energy (Ku), a high out-of-plane coercive field ($Hc_\perp$) and a low in-plane coercive field ($Hc_{//}$). It is known in the art that the magnetic material having an ordered phase (or $L1_0$ phase), i.e., a face-centered tetragonal (FCT) crystal structure with a [001] preferred orientation, exhibits a high out-of-plane coercive field and a low in-plane coercive field.

Conventionally, the ordered phase of the magnetic material can be obtained by subjecting a non-ordered magnetic material to an annealing treatment under a phase-changing temperature higher than 500° C. Since the phase-changing temperature is relatively high, it is problematic to integrate the annealing treatment into an integrated circuit (IC) manufacturing process.

A method of ordering FePt alloy is described by the inventors in Journal of Applied Physics 105, 07A713 (2009), "Ultrahigh-density [001]-oriented FePt nanoparticles by atomic-scale-multilayer deposition" (hereinafter referred to as Document 1). The method disclosed in Document 1 involves the step of depositing a multilayer film of [Fe/Pt/$SiO_2$]$_n$ on a $SiO_2$ layer on a silicon wafer using planetary sputtering techniques, followed by subjecting the multilayer film to rapid thermal annealing under 700° C. for a time period ranging from 2 seconds to 6 hours.

In Document 1, a sample (A) of the multilayer film (n=18) annealed at 700° C. for 2 seconds has X-ray diffraction peaks of [001] orientation and [002] orientation of ordered $L1_0$-phase FePt. However, sample (A) has a large average grain size and a broad size distribution (about 112±33.6 nm), which is not suitable for making ultrahigh-density perpendicular recording media. In addition, a sample (B) (n=3) annealed at 700° C. for 6 hours has a smaller average grain size and a narrower size distribution (3.9±0.43 nm) as compared to those of sample (A). However, sample (B) has relatively small X-ray diffraction peaks of [001] orientation and [002] orientation of ordered $L1_0$-phase FePt and a poor magnetic property. Although the out-of-plane coercive field ($Hc_\perp$) of sample (B) can be improved by increasing the annealing time to 6 hours, the phase-changing temperature is too high to allow the annealing treatment to be integrated into the IC manufacturing process.

T. Narisawa et al. disclose a method of ordering FePt alloy in an article entitled "[001]-oriented nonepitaxial growth in $L1_0$-ordered FePt thin film by $SiO_2$ addition and rapid thermal annealing" (Journal of Applied Physics 109, 033918, 2011) (hereinafter referred to as Document 2). The method of Document 2 involves the step of subjecting a multilayer film of (Fe/Pt/$SiO_2$)$_{9\sim72}$ to rapid thermal annealing under a phase-changing temperature ranging from 450 to 800° C. for 5 seconds to 2 hours. The multilayer film is heated to the phase-changing temperature with a heating rate ranging from 10 to 50 K/s. The multilayer film, including a plurality of Fe layers (each having a thickness of 0.16 nm), a plurality of Pt layers (each having a thickness of 0.18 nm) and a plurality of $SiO_2$ layers (each having a thickness of about 0.1 nm), was prepared by sputtering repeatedly and alternately a Fe target, a Pt target, and a $SiO_2$ target on a thermal oxidization silicon substrate.

In Document 2, the multilayer film of an example (1) was heated to 700° C. with a heating rate of 30 K/s and was annealed at 700° C. for 2 hours. The result of example (1) shows that the intensity of the X-ray diffraction peak of [001] orientation increases with an increase in the amount of $SiO_2$ in the multilayer film. The X-ray diffraction peak of [001] orientation reaches a maximum intensity when the amount of $SiO_2$ is 10 vol %. When the amount of $SiO_2$ is between 12 to 15 vol %, the intensity of the X-ray diffraction peak of [001] orientation is considerably decreased. In an example (2), the multilayer film was heated to 500° C. with a heating rate of 46 K/s, and was annealed at 500° C. for one hour. The result of example (2) shows that a volume fraction of $L1_0$ domains ($V_{fct}$) (see FIG. 1) is rapidly increased from 0 to 0.23 in 1 to 2 minutes after the phase-changing temperature reaches 500° C., and remains substantially unchanged thereafter till the end of the annealing. In an example (3), the multilayer film was heated to 700° C. with a heating rate of 30 K/s, and was annealed at 700° C. for two hours. The result of example (3) shows that the volume fraction of $L1_0$ domains ($V_{fct}$) (see FIG. 1) is rapidly increased from 0 to 0.85 in about 10 minutes after the phase-changing temperature reaches 700° C., and is gradually increased to close to 1 after annealing for two hours.

The volume fraction of $L1_0$ domains ($V_{fct}$=0.23) of the annealed multilayer film of example (2) of Document 2, which is annealed at 500° C., is unsatisfactory for application to the high storage density perpendicular magnetic recording medium. Although a higher volume fraction of $L1_0$ domains ($V_{fct}$=0.85) of the multilayer film of example (3) can be achieved by annealing the multilayer film at 700° C., the phase-changing temperature is too high to allow the annealing of the multilayer film to be integrated into the integrated circuit manufacturing process. In addition, such a high temperature can result in an increase in the capital cost and/or the equipment cost of manufacturing the ordered FePt alloy.

As such, there is a need to further develop a method of making the multilayer film of an ordered magnetic material that can be integrated into the integrated circuit manufacturing process and that can lower the capital and/or equipment cost.

SUMMARY OF THE INVENTION

Therefore, an object of the present invention is to provide a method for making an ordered magnetic alloy that can overcome at least one of the aforesaid drawbacks associated with the prior art.

According to this invention, there is provided a method for making an ordered magnetic alloy that includes: (a) providing a thermally conductive base having opposite first and second surfaces; (b) forming a thermal barrier layer on the first surface of the thermally conductive base; (c) forming a disordered magnetic alloy layer on the thermal barrier layer, the disordered magnetic alloy layer being made from a disordered alloy which contains a first metal selected from Fe, Co, and Ni, and a second metal selected from Pt and Pd; and (d) after step (c), applying a transient heat to the thermally conductive base to cause rapid thermal expansion of the thermally conductive base, which, in turn, causes generation of an in-plane tensile stress in the disordered magnetic alloy layer to thereby order the disordered magnetic alloy layer.

BRIEF DESCRIPTION OF THE DRAWINGS

In drawings which illustrate an embodiment of the invention.

DETAILED DESCRIPTION OF THE PREFERRED EMBODIMENT

Figure 1:
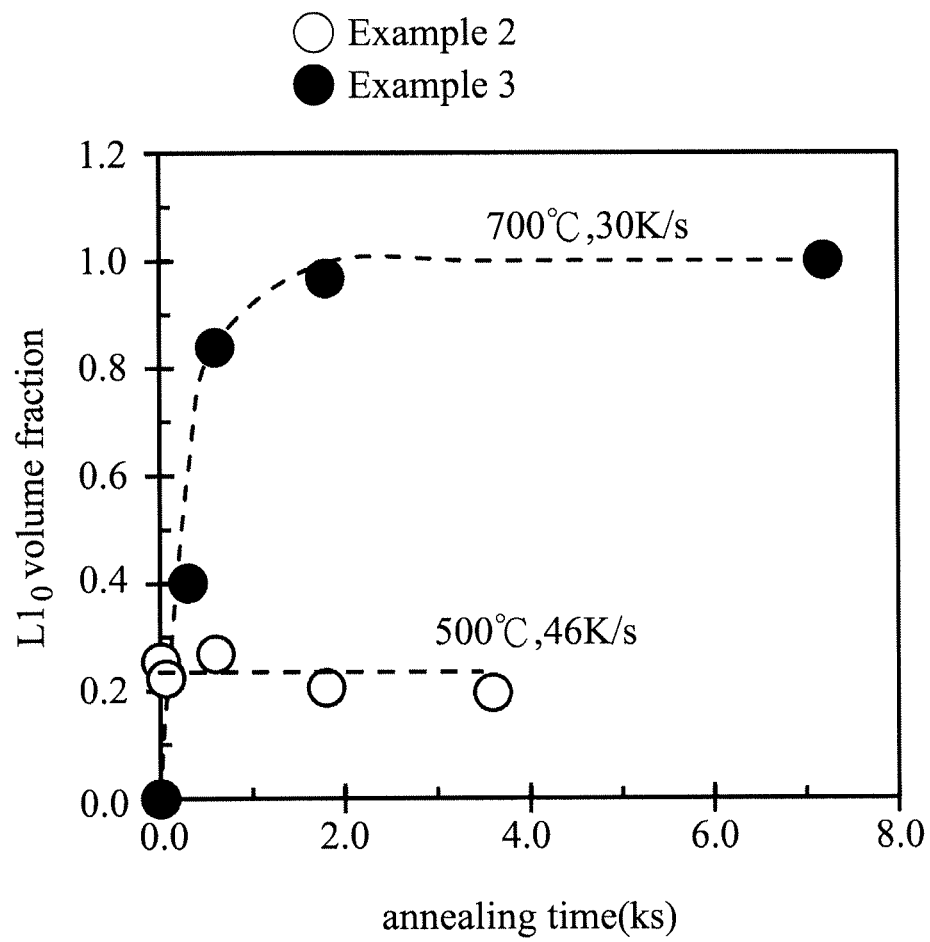
FIG. 1 is a plot of the volume fraction of $L1_0$ domains ($L1_0$ phase) versus annealing time, showing the volume fraction of $L1_0$ domains of example (2) and example (3) disclosed in Document 2.
Figure 2:
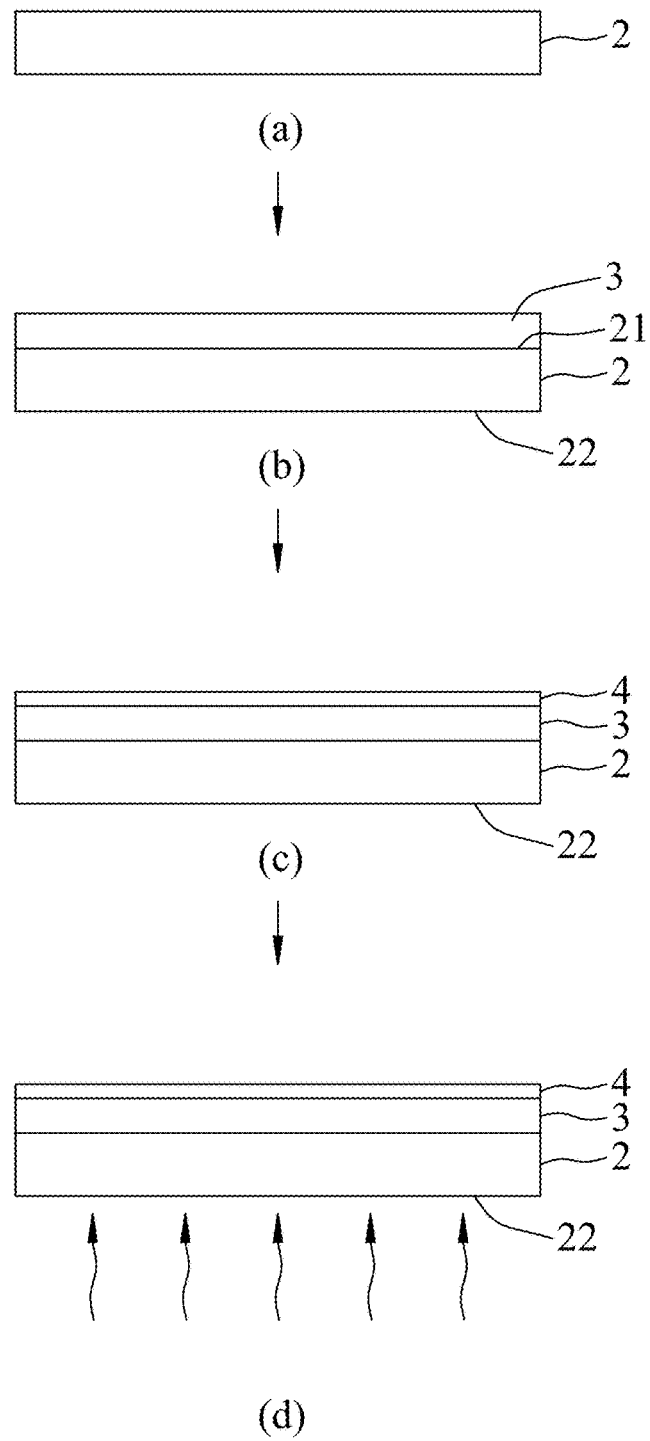
FIGS. 2a to 2d are schematic views illustrating consecutive steps of the preferred embodiment of a method for making an ordered magnetic alloy according to the present invention.
Figure 3:
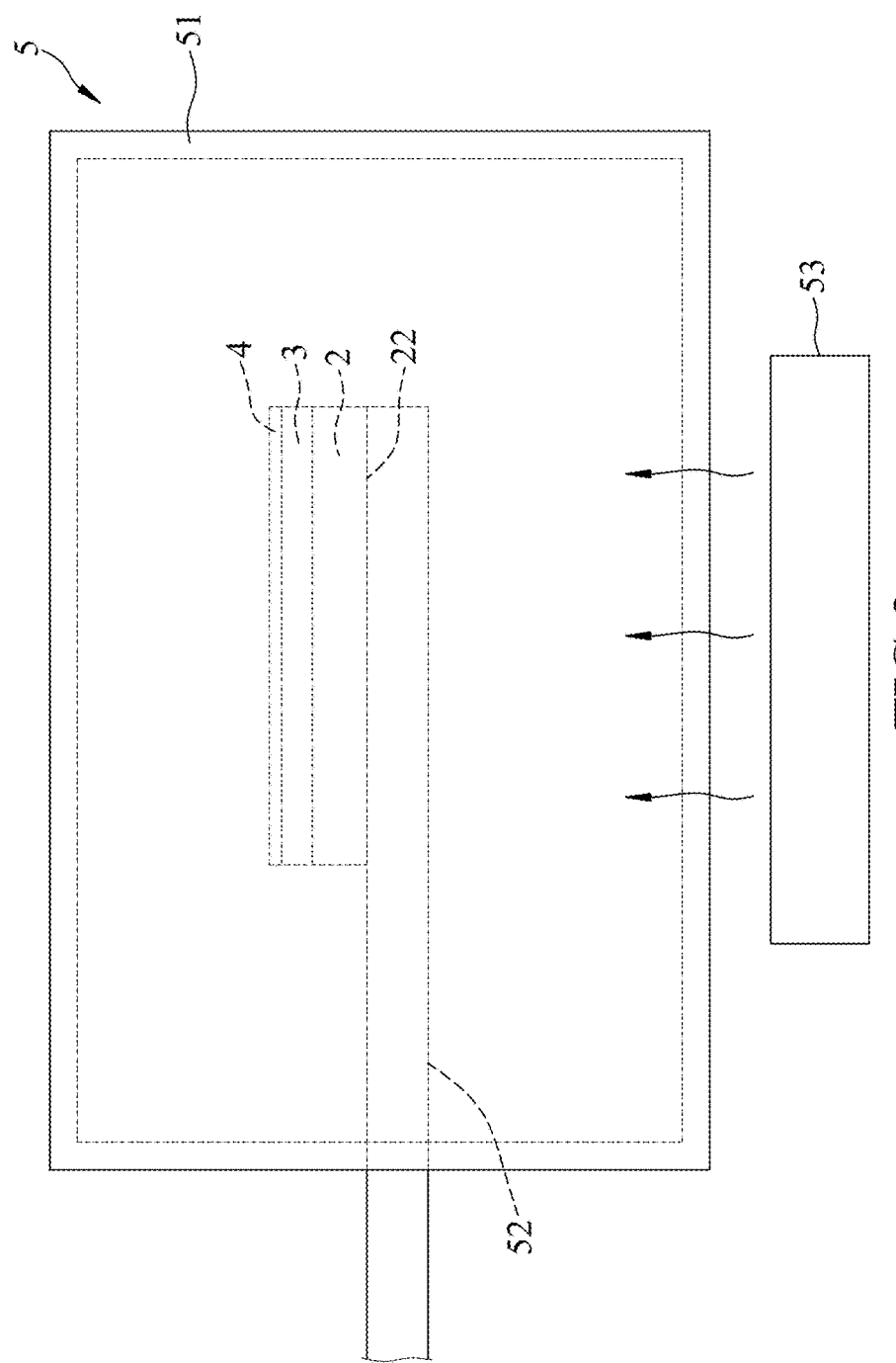
FIG. 3 is a schematic view to illustrate how a thermally conductive base of a stack is heated in a heating system used in the preferred embodiment.

Referring to FIGS. 2 and 3, the preferred embodiment of a method for making an ordered magnetic alloy includes: (a) providing a thermally conductive base 2 having opposite first and second surfaces 21, 22 (see FIG. 2a); (b) forming a thermal barrier layer 3 on the first surface 21 of the thermally conductive base 2 (see FIG. 2b); (c) forming a disordered magnetic alloy layer 4 on the thermal barrier layer 3 (see FIG. 2c), the disordered magnetic alloy layer 4 being made from a disordered alloy which contains a first metal selected from Fe, Co, and Ni, and a second metal selected from Pt and Pd, the disordered magnetic alloy layer 4 cooperating with the thermal barrier layer 3 and the thermally conductive base 2 to form a stack; and (d) after step (c), applying a transient heat to the thermally conductive base 2 of the stack such that a sharp temperature difference is created between the thermally conductive base 2 (which becomes a hot side of the stack) and the disordered magnetic alloy layer 4 (which becomes a cold side of the stack), thereby causing rapid thermal expansion of the thermally conductive base 2 (see FIG. 2d), which, in turn, causes generation of an effective amount of an in-plane tensile stress in the disordered magnetic alloy layer 4 to thereby order the disordered magnetic alloy layer 4 to form an ordered magnetic alloy layer.

Preferably, the application of the transient heat in step (d) is conducted by heating the thermally conductive base 2 from an initial temperature to a phase-changing temperature $T_a$ within 300 seconds at a heating rate, such that a volume fraction of an ordered phase of the ordered alloy greater than 0.7 is achieved when $T_a \leq 0.45 T_m$, where $T_m$ is the melting point of the disordered alloy. The initial temperature can be room temperature or a temperature that permits realization of the generation of the effective amount of the in-plane tensile stress in the disordered magnetic alloy layer 4 after the application of the transient heat.

Preferably, the application of the transient heat is operated at a heating rate greater than 15° C./sec (more preferably, within 60 seconds at a heating rate ranging from 20 to 50° C./sec), such that $0.13T_m < T_a < 0.35T_m$.

Preferably, the thermally conductive base 2 is made from Si and the thermal barrier layer 3 is made from silica. The ordered magnetic alloy layer has [001] preferred orientation. Preferably, the thermally conductive base 2 has a thickness ranging from 1.5 to 650 μm, and the thermal barrier layer 3 has a thickness ranging from 10 to 400 nm, and more preferably, the thickness of the thermally conductive base 2 ranges from 1.5 to 450 μm, and the thickness of the thermal barrier layer 3 ranges from 10 to 200 nm.

Preferably, the first metal is Fe and the second metal is Pt (i.e., the disordered alloy of the disordered magnetic alloy layer 4 is FePt alloy, the melting point $T_m$ of which is 1500° C. Preferably, when the disordered magnetic alloy layer 4 is FePt alloy, the phase-changing temperature is within a range such that $0.26T_m < T_a < 0.30T_m$ (i.e., 390° C.$< T_a \leq$450° C.).

Preferably, the application of the transient heat in step (d) is performed using a heating system 5, wherein the stack is placed on a stage 52 in a vacuum quartz tube 51 of the heating system 5 (see FIG. 3) under a pressure of about $1\times10^{-5}$ torr and that the thermally conductive base 2 of the stack is heated with a light source 53 having a wavelength ranging from 400 nm to 1100 nm. Preferably, the light source 53 is an IR lamp.

It is noted that the thermally conductive base 2 is made from silicon that has an energy gap of 1.1 eV, and that absorbs only the light having a wavelength shorter than 1117 nm. In contrast, the thermal barrier layer 3 is made from silicon dioxide ($SiO_2$) that has an energy gap of 8.9 eV, and that absorbs only the wavelength shorter than 139 nm. As such, when the thermally conductive base 2 is rapidly heated by the light source 53, only a limited amount of heat is conducted to the disordered magnetic alloy layer 4, which results in the creation of the hot side and the cold side of the stack and the thermal expansion of the thermally conductive base 2 that leads to the generation of the in-plane tensile stress in the disordered magnetic alloy layer 4.

The disordered magnetic alloy layer 4 is formed by depositing a multilayer film with a structure of [the first metal/the second metal]$_n$ on the thermal barrier layer 3 using planetary sputtering techniques. In a preferred embodiment, n is equal to one and the multilayer film includes a layer of Fe (the first metal) and a layer of Pt (the second metal). The disordered magnetic alloy layer 4 can optionally further contain an oxide, and has a structure of [the first metal/the second metal/the oxide]$_n$. Preferably, the oxide is $B_2O_3$. In another preferred embodiment, n is equal to one, the multilayer film includes a layer of the first metal, a layer of the second metal and a layer of the oxide, the thickness of the thermally conductive base 2 ranges from 450 µm to 650 µm, and the phase-changing temperature is within a range such that $0.18T_m < T_a \leq 0.20 T_m$ (i.e., 270° C.<Ta≤300° C. for FePt alloy).

In yet another preferred embodiment, n is equal to one, the multilayer film includes a layer of the first metal, a layer of the second metal and a layer of the oxide, the thickness of the thermally conductive base ranges from 200 µm to 300 µm, and the phase-changing temperature is within a range such that $0.13T_m < T_a \leq 0.20 T_m$ (i.e., 195° C.<Ta≤300° C. for FePt alloy).

The following examples are provided to illustrate the preferred embodiment of the present invention, and should not be construed as limiting the scope of the invention.

EXAMPLES

Example 1 (E1)

A silicon substrate having a thickness of 450 µm was provided as the thermally conductive base 2. A 30 nm $SiO_2$ layer was deposited on the silicon substrate as the thermal barrier layer 3 by sputtering techniques. A total thickness of 5 nm of a FePt alloy layer (including a sub-layer of Fe and a sub-layer of Pt) was deposited on the $SiO_2$ layer as the disordered magnetic alloy layer 4 by co-sputtering techniques (or planetary sputtering techniques) so as to form a stack of the thermally conductive base 2, the thermal barrier layer 3 and the disordered magnetic alloy layer 4. The stack was placed on a quartz stage 52 in the vacuum quartz tube 51 of the heating system 5 (see FIG. 3) which was operated under a pressure of $1 \times 10^{-5}$ torr. The second surface 22 of the thermally conductive base 2 was directly irradiated by a light having a wavelength ranging from 400 nm-1100 nm and generated from the near-infrared light source 53, such that the thermally conductive base 2 was heated from room temperature to 400° C. (i.e., the phase-changing temperature, $T_a$) at a heating rate of 15° C./sec, and was maintained at the phase-changing temperature for 10 seconds before turning off the power of the near-infrared light source 53, thereby converting the disordered magnetic alloy layer 4 into an ordered magnetic alloy layer of an ordered FePt alloy.

Examples 2 to 4 (EX2 to EX4)

The conditions of preparing the ordered magnetic alloy (ordered FePt alloy) of each of Examples 2 to 4 (EX2 to EX4) of the present invention were similar to those of Example 1 (E1), except that the heating rates of EX2 to EX4 were 20, 25, and 40° C./sec, respectively.

Figure 4:
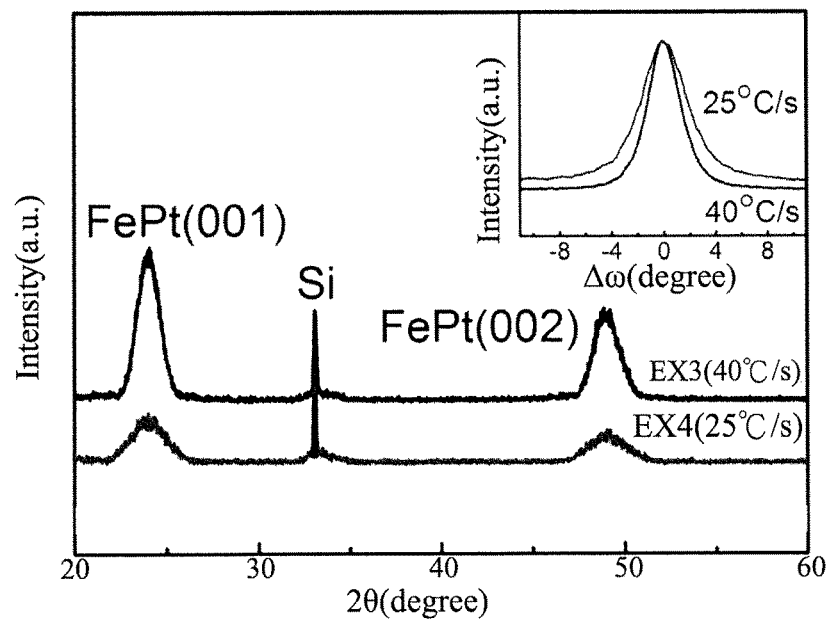
FIG. 4 is a diagram of an X-Ray Diffraction (XRD) pattern and an X-Ray rocking curve showing the crystal structures of ordered FePt alloys for Examples 3 and 4.

FIG. 4 shows the XRD patterns of the ordered FePt alloys of EX3 and EX4, each having diffraction peaks of [001] orientation and [002] orientation of $L1_0$-FePt.

Figure 5:
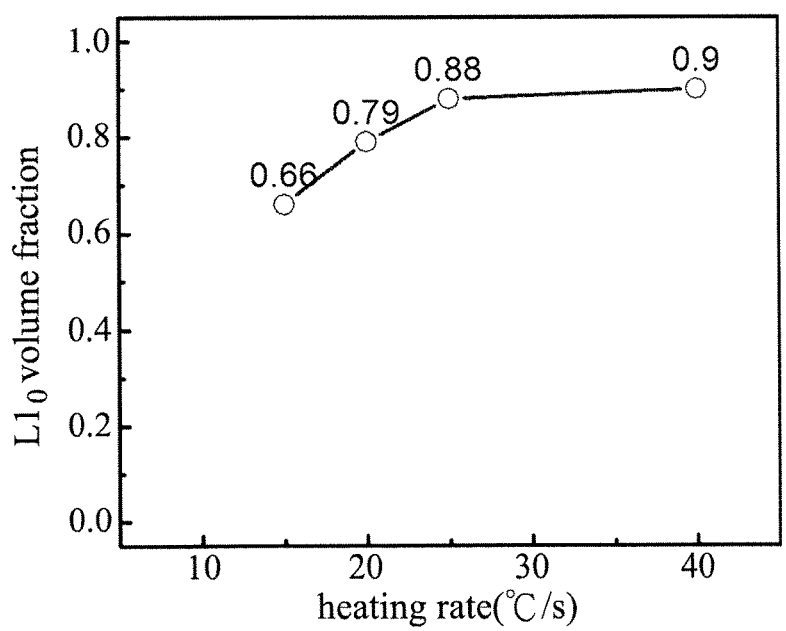
FIG. 5 is a plot of the volume fraction of $L1_0$ domains ($L1_0$ phase) versus heating rate for Examples 1 to 4.

Referring to FIG. 5, the volume fractions of $L1_0$ domains of the ordered FePt alloys of EX1 to Ex4 are respectively 0.66, 0.79, 0.88 and 0.9.

Figure 6:
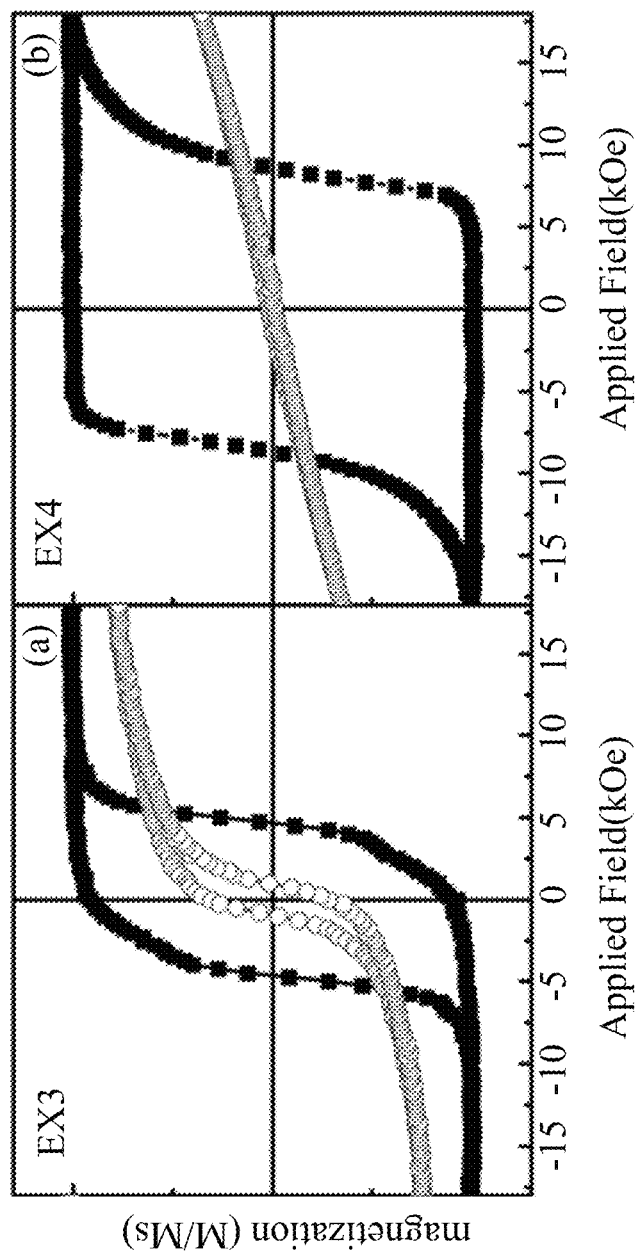
FIGS. 6a and 6b are plots of vertical and horizontal hysteresis-loops for Examples 3 and 4, respectively.
Figure 7:
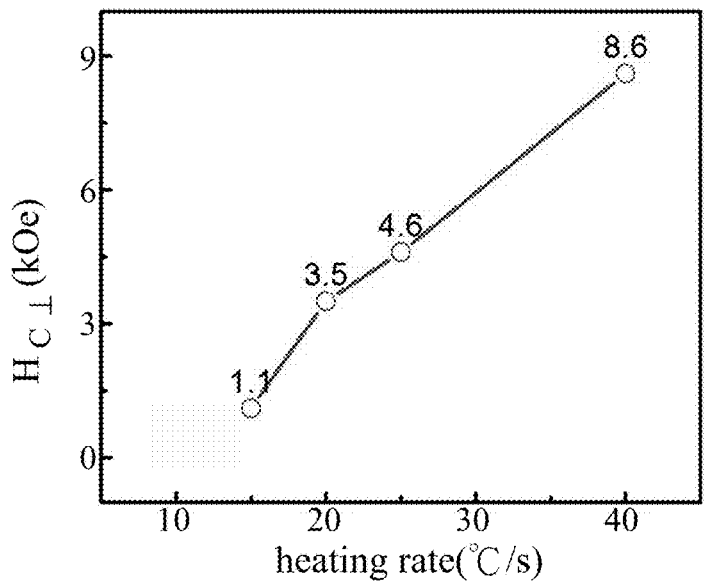
FIG. 7 is a plot of the heating rate versus the out-of-plane coercive field ($Hc_\perp$) for Examples 1 to 4.

FIGS. 6(a) and 6(b) show the hysteresis loops of the out-of-plane coercivity ($Hc_\perp$) and the in-plane coercive field ($Hc_{//}$) for the ordered FePt alloys of EX3 and EX4, respectively. A comparison in the out-of-plane coercivity ($Hc_\perp$) between Ex3 and Ex4 shows that the out-of-plane coercivity ($Hc_\perp$) is increased by increasing the heating rate. As shown in FIG. 6(b), the shape of the in-plane coercive field ($Hc_{//}$) of EX4 resembles a straight line, which is an indication of the presence of [001]-preferred orientation. As shown in FIG. 7 and Table 1, the out-of-plane coercivity ($Hc_\perp$) is increased from 1.1 (EX1) to 8.6 (EX4) by increasing the heating rate from 15 to 40° C./sec, while maintaining the in-plane coercive field ($Hc_{//}$) at a value less than 1.0 kOe.

TABLE 1

|    | Thickness              |                              | Disordered                         | Transient heat    |           | Volume                           |              |                |
| -- | ---------------------- | ---------------------------- | ---------------------------------- | ----------------- | --------- | -------------------------------- | ------------ | -------------- |
| EX | conductive base Si(µm) | Thermal barrier layer SiO$_2$ (nm) | magnetic alloy layer$^a$ | Rate ° C./s | Ta ° C. | fraction of L1$_0$ domains | Hc$_\perp$ kOe | Hc$_{//}$ kOe |
| 1  | 450.0                  | 30                           | FePt                               | 15                | 400       | 0.660                            | 1.1          | 0.6            |
| 2  | 450.0                  | 30                           | FePt                               | 20                | 400       | 0.790                            | 3.4          | 0.8            |
| 3  | 450.0                  | 30                           | FePt                               | 25                | 400       | 0.880                            | 4.6          | 1.0            |
| 4  | 450.0                  | 30                           | FePt                               | 40                | 400       | 0.900                            | 8.6          | 0.6            |

$^a$Chemical composition of the disordered FePt alloy of each Example is Fe$_{55}$Pt$_{45}$ (determined by inductively coupled plasma-mass spectrometry).

Examples 5 to 8 (EX5 to EX8)

The conditions of preparing the stacks of Examples 5 to 8 (EX5 to EX8) of the present invention were similar to those of EX4, except that the thicknesses of the thermal barrier layers 3 of EX5 to EX8 were 10, 60, 100, and 200 nm, respectively.

Figure 8:
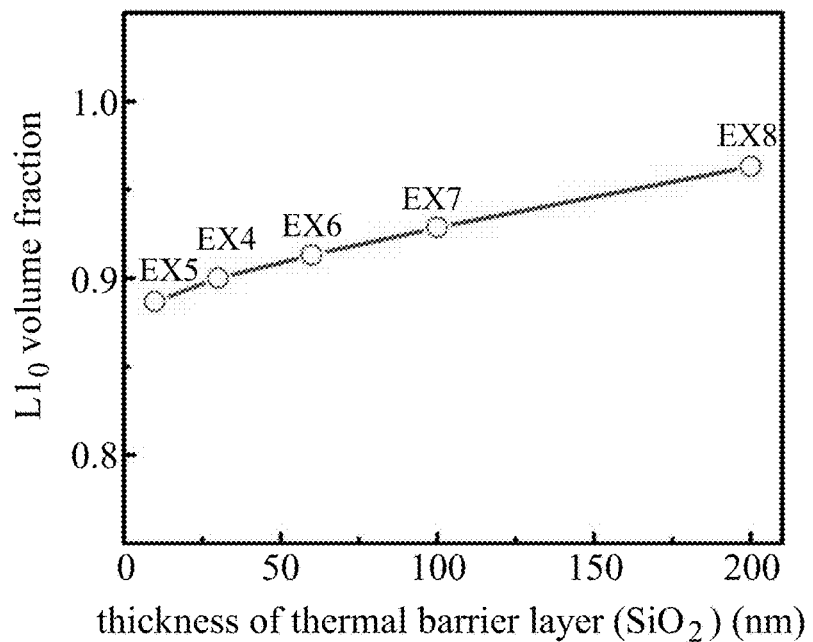
FIG. 8 is a plot of the thickness of a thermal barrier layer versus the volume fraction of $L1_0$ domains for Examples 5 to 8.

As shown in FIG. 8 and Table 2, the volume fraction of $L1_0$ domains of the ordered FePt alloy is increased from 0.885 (EX5) to 0.960 (EX8) by increasing the thickness of the thermal barrier layer 3 ($SiO_2$) from 10 nm to 200 nm.

TABLE 2

| EX | Thermally conductive base Si (μm) | Thermal barrier layer SiO$_2$ (nm) | Disordered magnetic alloy layer[a] | Transient heat Rate °C./s | Ta °C. | Volume fraction of L1$_0$ domains | Hc$_\perp$ kOe | Hc$_{//}$ kOe |
|---|---|---|---|---|---|---|---|---|
| 5 | 450.0 | 10  | FePt | 40 | 400 | 0.885 | 6.3  | 1.0 |
| 4 | 450.0 | 30  | FePt | 40 | 400 | 0.900 | 8.6  | 0.6 |
| 6 | 450.0 | 60  | FePt | 40 | 400 | 0.910 | 10.1 | 0.6 |
| 7 | 450.0 | 100 | FePt | 40 | 400 | 0.930 | 13.6 | 0.6 |
| 8 | 450.0 | 200 | FePt | 40 | 400 | 0.960 | 19.0 | 0.5 |

[a]Chemical compositions of the disordered FePt alloy of each Example is Fe$_{55}$Pt$_{45}$ (determined by inductively coupled plasma-mass spectrometry).

Figure 9:
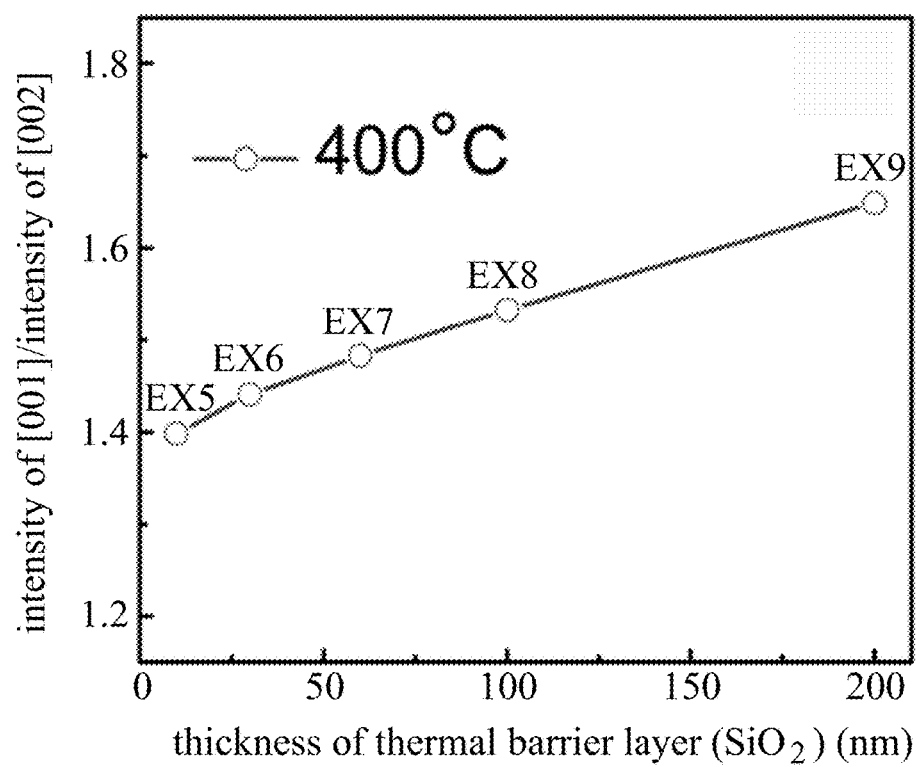
FIG. 9 is a plot of the thickness of the thermal barrier layer versus the ratio of intensity of an X-ray diffraction peak of [001] orientation to that of [002] orientation for Examples 4 to 8.

As shown in FIG. 9, the ratio of the intensity of X-ray diffraction peak of [001] orientation to that of [002] orientation is increased by increasing the thickness of the thermal barrier layer 3. It is noted that increasing the thickness of the thermal barrier layer 3 inherently increases the resistance for heat conduction from the thermally conductive base 2 to the disordered FePt alloy layer 4 during application of the transient heat, which results in an increase in the in-plane tensile stress in the disordered magnetic alloy layer 4 (FePt alloy), which, in turn, results in an increase in the ratio of the intensity of the X-ray diffraction peak of [001] orientation to that of [002] orientation. In addition, the out-of-plane coercivity (Hc$_\perp$) is increased from 6.3 kOe (EX5) to 19.0 kOe (EX8), and the in-plane coercive field (Hc$_{//}$) is decreased from 1.0 kOe (EX5) to 0.5 kOe (EX8) by increasing the thickness of the thermal barrier layer 3 from 10 nm to 200 nm.

Examples 9 to 11 (EX9 to EX11)

The conditions of preparing the stacks of Examples 9 to 11 (EX9 to EX11) of the present invention were similar to those of EX4, except that the thermally conductive base 2 was prepared by depositing a Si layer on a glass substrate, and that the thicknesses of the Si layers of EX9 to EX11 were 1.5, 3.0, 6.0 μm, respectively. The phase-changing temperature T$_a$ for EX9 to EX11 was 450° C.

Figure 10:
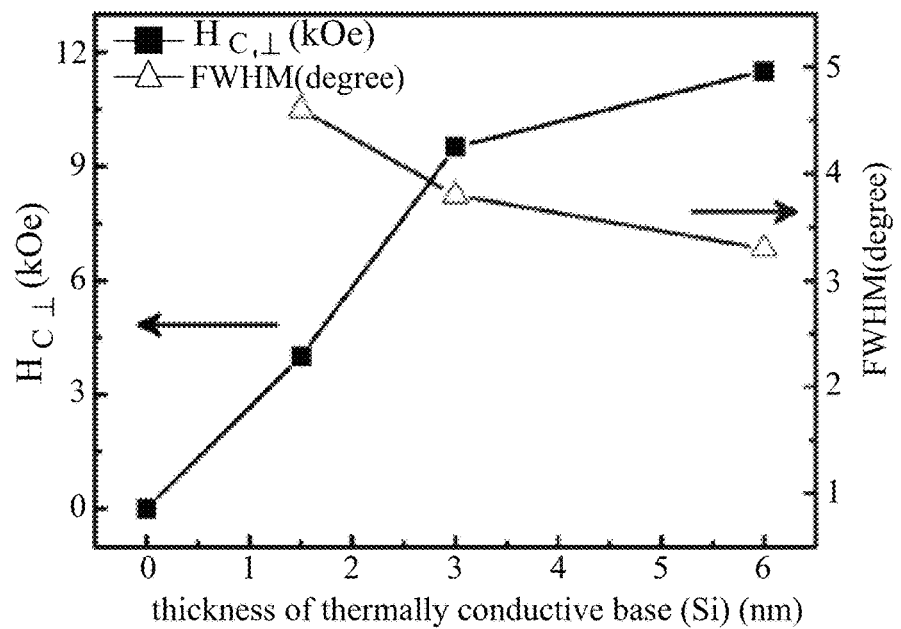
FIG. 10 is a plot of the thickness of the thermally conductive base versus the out-of-plane coercivity ($Hc_\perp$) and versus the full-width at half-maximum (FWHM) value for Examples 9 to 11.
Figure 11:
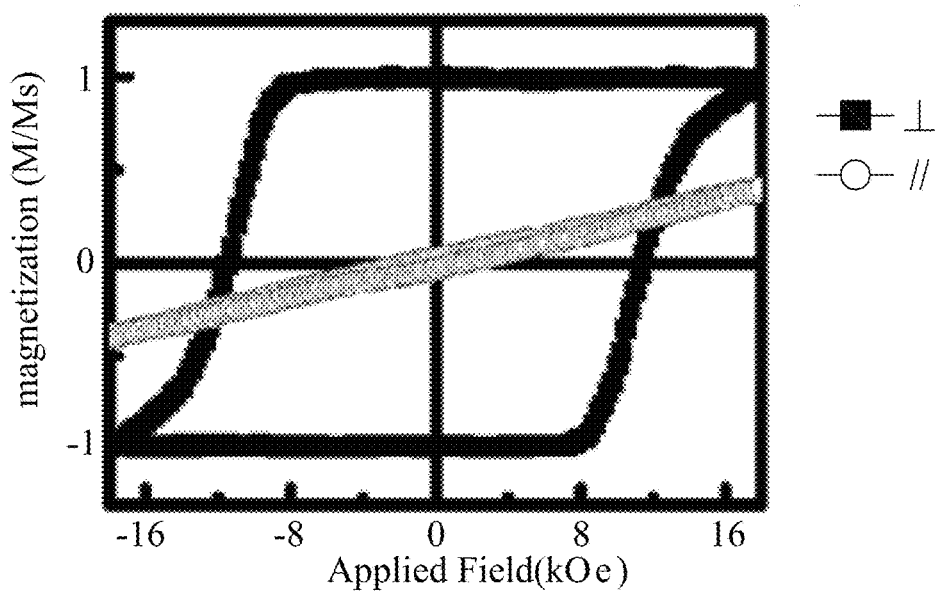
FIG. 11 is a plot of vertical and horizontal hysteresis-loops for Example 11.

As shown in FIG. 10 and Table 3, the out-of-plane coercivity (Hc$_\perp$) of the ordered FePt alloy is increased from 4.0 kOe (EX9) to 11.5 kOe (EX11) by increasing the thickness of the Si layer of the thermally conductive base 2 from 1.5 μm to 6.0 μm. The full-width at half-maximum value of the X-ray diffraction peaks of [001] orientation for EX9 to EX11 are 4.7°, 3.8°, and 3.3°, respectively. In addition, the in-plane coercivity (Hc$_{//}$) of EX9 to EX11 is slightly increased with an increase of the thickness of the Si layer. However, as shown in FIG. 11, the horizontal hysteresis loop of EX11 resembles a straight line, which indicates that the ordered FePt alloy of EX11 has excellent perpendicular magnetic anisotropic.

Examples 12 and 14 (EX12 and EX14)

The conditions of preparing the stacks of Examples 12 to 14 (EX12 to EX14) of the present invention were similar to those of EX3, except that the thickness of the thermally conductive base 2 of each of Examples 12 to 14 was 650 μm, that the disordered magnetic alloy layer 4 had a sub-layer of Fe, a sub-layer of Pt and a sub-layer of B$_2$O$_3$ (FePt—B$_2$O$_3$ alloy) with a total thickness of 5.9 nm (the sub-layer of B$_2$O$_3$ having a thickness of 0.9 nm), that the heating rate was 50° C./sec, and that the phase-changing temperatures T$_a$ of EX12 to EX14 were 250, 280 and 300° C., respectively.

TABLE 3

| | Thickness Si layer on glass (μm) | Thermal barrier layer SiO$_2$ (nm) | Disordered magnetic alloy layer[a] | Transient heat Rate °C./s | Ta °C. | Hc$_\perp$ (kOe) | HC$_{//}$ (kOe) |
|---|---|---|---|---|---|---|---|
| EX 9  | 1.5 | 30 | FePt | 40 | 450 | 4.0  | 1.0 |
| EX 10 | 3.0 | 30 | FePt | 40 | 450 | 9.5  | 1.2 |
| EX 11 | 6.0 | 30 | FePt | 40 | 450 | 11.5 | 1.3 |

[a]Chemical compositions of the disordered FePt alloy of each Example is Fe$_{55}$Pt$_{45}$ (determined by inductively coupled plasma-mass spectrometry).

TABLE 4

| | Thickness | | | Transient heat | | | |
|---|---|---|---|---|---|---|---|
| | Thermally conductive base Si(μm) | Thermal barrier layer $SiO_2$(nm) | Disordered magnetic alloy layer[a] | Rate (° C./s) | Ta(° C.) | $Hc_\perp$ (kOe) | $Hc_{//}$ (kOe) |
| EX 12 | 650.0 | 30 | FePt—$B_2O_3$[b] | 50 | 250 | 1.0 | 1.2 |
| EX 13 | 650.0 | 30 | FePt—$B_2O_3$[b] | 50 | 280 | 7.0 | 1.7 |
| EX 14 | 650.0 | 30 | FePt—$B_2O_3$[b] | 50 | 300 | 8.5 | 3.7 |

[a]Chemical compositions of the disordered FePt alloy of each Example is $Fe_{55}Pt_{45}$ (determined by inductively coupled plasma-mass spectrometry).
[b]Measured by atomic force microscope (AFM).

Figure 12:
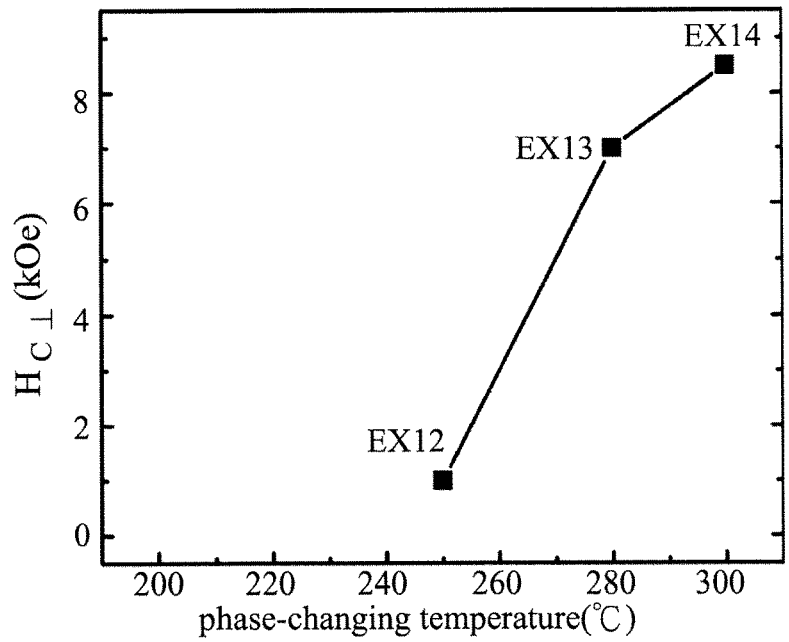
FIG. 12 is a plot of the phase-changing temperature versus the out-of-plane coercive field ($Hc_\perp$) for Examples 12 to 14.

As shown in FIG. 12 and Table 4, the out-of-plane coercivity ($Hc_\perp$) is increased from 1.0 kOe (EX12) to 8.5 kOe (EX14) by increasing the phase-changing temperature from 250° C. to 300° C.

Examples 15 and 18 (EX15 to EX18)

The conditions of preparing the stacks of Examples 15 to 18 (EX15 to EX18) of the present invention were similar to those of EX12, except that each thermally conductive base 2 of EX15 to EX18 was a silicon substrate having a thickness 250 μm and Ta for E15 to E18 were 200° C., 250° C., 280° C., and 300° C., respectively (see Table 5).

TABLE 5

| | Thickness | | | Transient heat | | | |
|---|---|---|---|---|---|---|---|
| | Thermally conductive base Si(μm) | Thermal barrier layer $SiO_2$(nm) | Disordered magnetic alloy layer[a] | Rate (° C./s) | Ta(° C.) | $Hc_\perp$ (kOe) | $Hc_{//}$ (kOe) |
| EX 15 | 250.0 | 30 | FePt—$B_2O_3$[b] | 50 | 200 | 5.0 | 3.5 |
| EX 16 | 250.0 | 30 | FePt—$B_2O_3$[b] | 50 | 250 | 7.5 | 1.5 |
| EX 17 | 250.0 | 30 | FePt—$B_2O_3$[b] | 50 | 280 | 9.3 | 1.3 |
| EX 18 | 250.0 | 30 | FePt—$B_2O_3$[b] | 50 | 300 | 12.0 | 1.0 |

[a]Chemical compositions of the disordered FePt alloy of each Example is $Fe_{55}Pt_{45}$ (determined by inductively coupled plasma-mass spectrometry).
[b]Measured by atomic force microscope (AFM).

Figure 13:
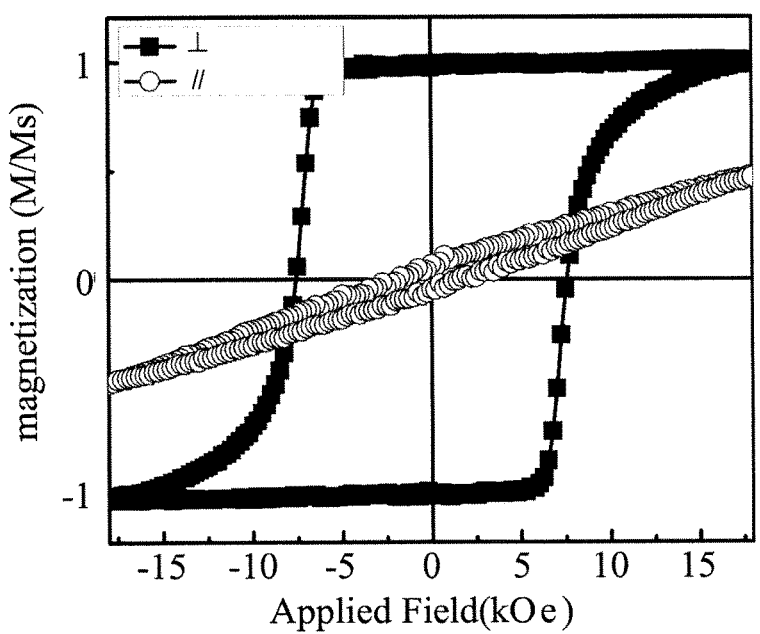
FIG. 13 is a plot of vertical and horizontal hysteresis-loops for Example 16.
Figure 14:
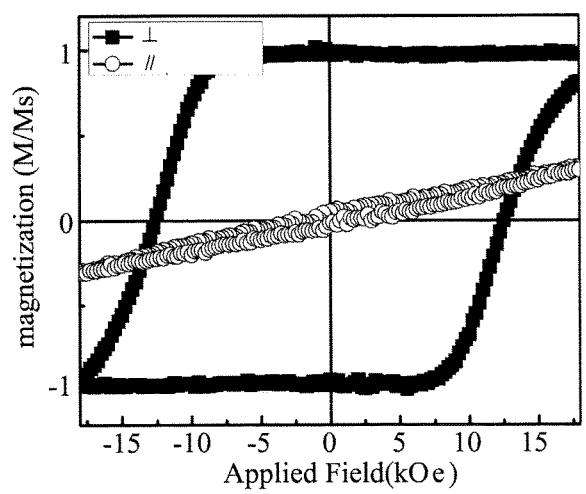
FIG. 14 is a plot of vertical and horizontal hysteresis-loops for Example 18.

As shown in FIGS. 13 (EX 16) and 14 (EX18) and Table 5, the area enclosed by the horizontal hysteresis loop is decreased when the phase-changing temperature $T_a$ is increased from 250° C. (EX16) to 300° C. (EX18).

Figure 15:
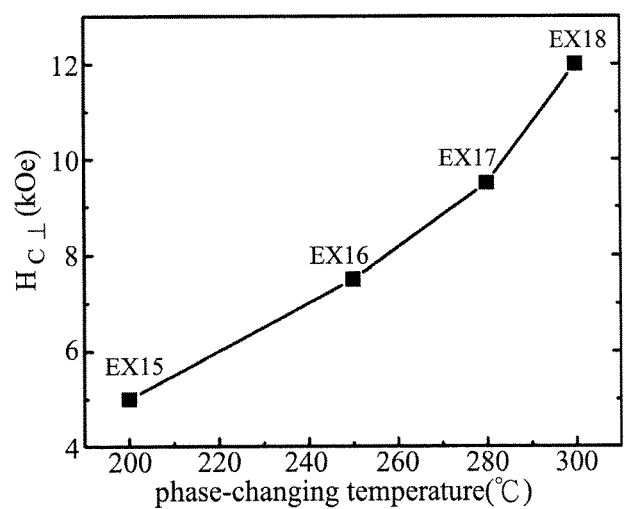
FIG. 15 is a plot of the phase-changing temperature $T_a$ versus the out-of-plane coercive field ($Hc_\perp$) for Examples 15 to 18.

As shown in FIG. 15 and Table 5, the out-of-plane coercivity ($Hc_\perp$) is 5.0 kOe for EX15 (the phase-changing temperature of which is 200° C.), and is 18.0 kOe for EX18 (the phase-changing temperature of which is 300° C.).

In conclusion, by applying a transient heat to the thermally conductive base 2 of the stack to raise the temperature of the thermally conductive base 2 from the initial temperature to the phase-changing temperature in the method of the present invention, a sharp temperature difference between the thermally conductive base 2 and the disordered magnetic alloy layer 4 is created, which results in a significant difference in thermal expansion between the thermally conductive base 2 and the disordered magnetic alloy layer 4, which, in turn, causes generation of an effective amount of an in-plane tensile stress in the disordered magnetic alloy layer 4, thereby forming an ordered magnetic alloy layer having [001] preferred orientation and increasing the volume fraction of $L1_0$ domains of the ordered magnetic alloy. Hence, formation of the ordered magnetic alloy having [001] preferred orientation can be achieved under a temperature of not greater than 450° C. during ordering of the disordered magnetic alloy layer 4 according to the method of this invention, which has at least one advantage of reducing the capital and/or equipment cost of manufacturing the ordered magnetic alloy as compared to the aforesaid conventional methods and which further has another advantage of permitting integration of the steps of the method of this invention into the IC manufacturing process when the temperature is further reduced to be not greater than 400° C.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A method for making an ordered magnetic alloy, comprising:
   (a) providing a thermally conductive base having opposite first and second surfaces;
   (b) forming a thermal barrier layer on the first surface of the thermally conductive base;
   (c) forming a disordered magnetic alloy layer on the thermal barrier layer, the disordered magnetic alloy layer being made from a disordered alloy which contains a first metal selected from Fe, Co, and Ni, and a second metal selected from Pt and Pd; and
   (d) after step (c), applying a transient heat to the thermally conductive base to cause rapid thermal expansion of the thermally conductive base, which, in turn, causes generation of an in-plane tensile stress in the disordered magnetic alloy layer to thereby order the disordered magnetic alloy layer,
   wherein the application of the transient heat in step (d) is conducted by heating the thermally conductive base from an initial temperature to a phase-changing temperature $T_a$ at a heating rate ranging from 20 to 50° C./sec, such that $0.13T_m < T_a < 0.35T_m$, where $T_m$ is the melting point of the disordered alloy, and wherein the application of the transient heat in step (d) is conducted by heating the second surface of the thermally conductive base with a light source having a wavelength ranging from 400 nm to 1100 nm.

2. The method of claim 1, wherein the thermally conductive base is made from Si, the thermal barrier layer being made from silica, the disordered magnetic alloy layer being ordered to form an ordered magnetic alloy layer having (001) preferred orientation.

3. The method of claim 1, wherein the thickness of the thermally conductive base ranges from 1.5 μm to 650 μm, and the thickness of the thermal barrier layer ranges from 10 nm to 400 nm.

4. The method of claim 3, wherein the first metal is Fe, and the second metal is Pt.

5. The method of claim 4, wherein the thickness of the thermally conductive base ranges from 1.5 μm to 450 μm, and the thickness of the thermal barrier layer ranges from 10 nm to 200 nm, and wherein $0.26T_m < T_a \leq 0.30T_m$.

6. The method of claim 4, wherein the disordered magnetic alloy layer further contains an oxide, the thickness of the thermally conductive base ranging from 450 μm to 650 μm, and wherein $0.18T_m < T_a \leq 0.20T_m$.

7. The method of claim 4, wherein the disordered magnetic alloy layer further contains an oxide, the thickness of the thermally conductive base ranging from 200 μm to 300 μm, and wherein $0.13T_m < T_a \leq 0.20T_m$.

* * * * *